Oct. 25, 1932.   F. G. SUCKOW   1,884,913
CUSHIONING MECHANISM
Filed April 30, 1929

Inventor
FRED G. SUCKOW
By
Attorney

Patented Oct. 25, 1932

1,884,913

UNITED STATES PATENT OFFICE

FRED GEORGE SUCKOW, OF DEPEW, NEW YORK, ASSIGNOR TO THE SYMINGTON COMPANY, OF NEW YORK, N. Y., A CORPORATION OF MARYLAND

CUSHIONING MECHANISM

Application filed April 30, 1929. Serial No. 359,369.

This invention relates to cushioning mechanism and more particularly to a form of draft gear using plate springs of special construction.

The principal object of my invention, generally considered, is to provide a friction draft gear in which friction elements are urged together by plate springs, said springs being preferably curved and formed with a corrugation adjacent each end thereof, said corrugation preferably providing a nib or projection extending from the concave face of the plate and adapted for reception in a corresponding depression in the supporting face of the associated friction element leaving corresponding depressions in the other face for receiving corresponding nibs on associated spring plates.

Another object of my invention is to provide the cushioning mechanism particularly adapted for railway draft gear involving friction elements urged into engagement with outer friction elements by curved plate springs, said springs being formed with corrugations or embossments providing means whereby said springs are held properly nested with respect to one another, so that shifting thereof and corresponding gouging of the associated elements is obviated.

A further object of my invention is to provide a friction draft gear involving friction elements urged into engagement with associated elements by a pair of sets of leaf or plate springs, the springs in each set being concavely curved toward the adjacent friction element, and the adjacent face of said element being convexly curved toward the springs to prevent the entire flattening thereof when the associated gear is compressed.

Other objects and advantages of the invention relating to the particular arrangement and construction of the various parts will become apparent as the description proceeds.

Referring to the drawing illustrating my invention, the scope whereof is defined by the appended claims.

Figure 1:
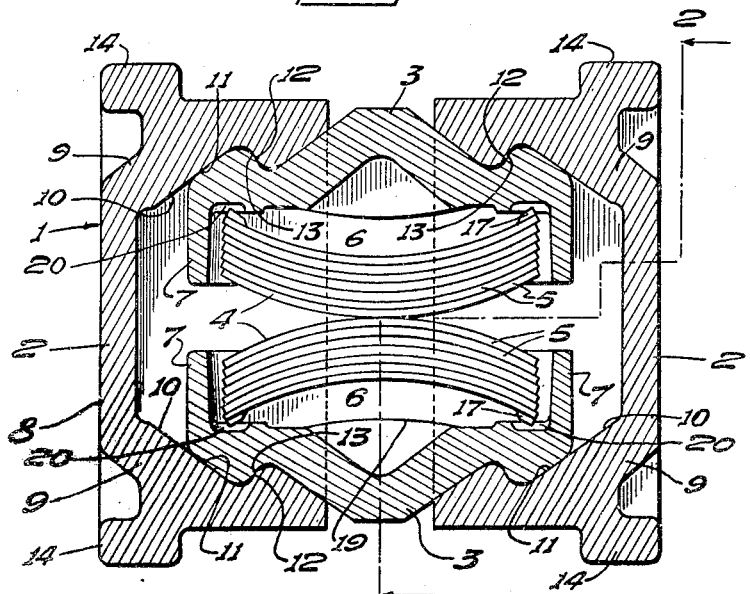
Figure 1 is a longitudinal sectional view of cushioning mechanism embodying my invention.
Figures 2, 3:
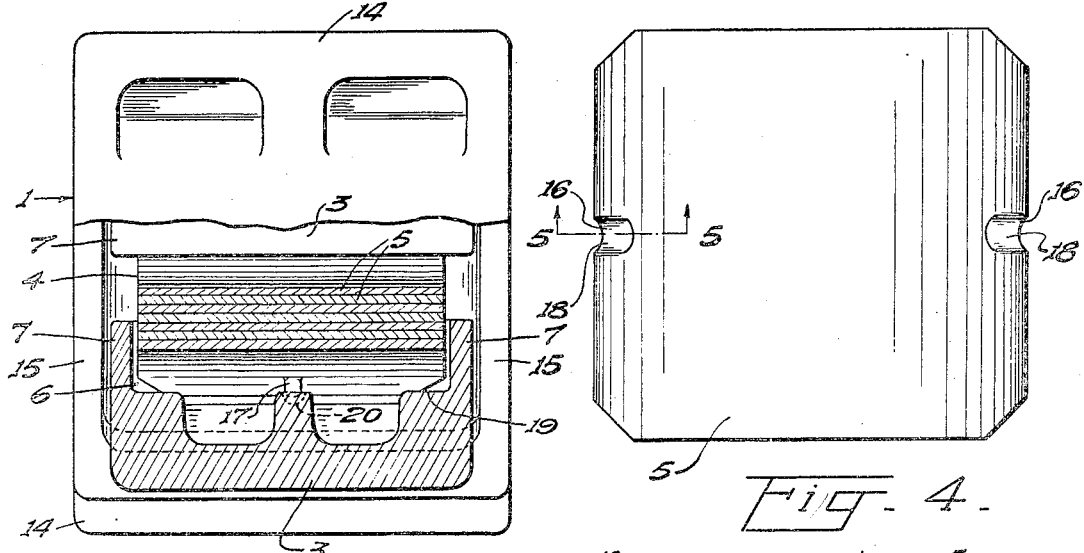
Figure 2 is a partial end elevation and partial transverse section on the line 2—2 of Figure 1 looking in the direction of the arrows.
Figure 3 is a detail side elevational view on a larger scale of one of the leaf or plate springs embodying my invention.
Figures 4, 5, 6:
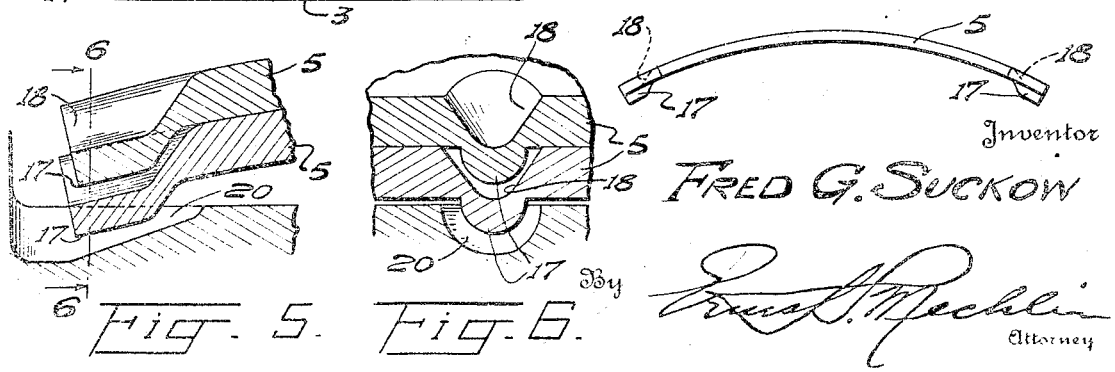
Figure 4 is an elevational view of the spring plate shown in Figure 3 looking at the edge thereof.
Figure 5 is a detail sectional view of a pair of spring plates such as shown in Figure 3, said section being taken on the line 5—5 thereof and being drawn to a still larger scale.
Figure 6 is a sectional view on the line 6—6 of Figure 5 looking in the direction of the arrows.

Referring to the drawing in detail, like parts being designated by like reference characters, I have shown a cushioning device or unit 1 involving a pair of outer friction elements or housing castings 2, a pair of intermediate friction elements or wedge members 3, and resilient means 4 disposed therebetween. Said resilient means is desirably formed as two sets of oppositely curved plate or leaf steel springs 5 which are received in inwardly opening pockets 6 in the wedges 3, which pockets are defined by peripheral flanges 7 normally extending toward each other.

Each outer friction element or housing casting 2 preferably comprises an outer or end wall 8 and inclined or diverging walls 9, the inner surfaces 10 of which form friction developing areas normally in engagement with corresponding surfaces 11 on the intermediate friction elements, spring caps, or wedge members 3. In order to provide for holding the parts in assembled relation without the use of auxiliary connecting means, the walls 9 are preferably shaped to provide shoulders 12, thereby breaking each friction surface 10 into the spaced surfaces connected by the corresponding shoulders 12. The wedge members 3 are formed with corresponding or complementary surfaces connected by shoulders 13. When the parts are assembled the shoulders 13 engage the corresponding shoulder 12 and hold the parts of the gear in assembled relation, the springs pressing the wedges outwardly so that the housing castings are normally interlocked therewith.

Extending outwardly from the walls 9 of the housing castings are flange or web portions 14 adapted to normally abut associated draft lugs, if used with such a type of draft rigging, to hold the gear in proper relation with respect to associated cheek plates and draft sills (not shown), said portions 14 extending a sufficient extent to make the ends of the gear correspond in outline with the usual followers employed with spring gears which are adapted for replacement by the present form of gear. The other walls or sides 15 of the end or housing castings 8 may be disposed normally parallel and serve to connect the inclined or angularly disposed walls 9 and hold the same rigidly with respect to each other and the corresponding end walls 8. The parts of the gear are so formed that the inner edges of the end or housing castings when in normal or released position, such as shown in Figure 1, are disposed at a distance apart corresponding with the normal or maximum travel or compressibility of the gear. It will be obvious that the gear may be employed with the intermediate friction elements disposed one above the other or side by side depending on the kind of rigging used therewith.

The plate springs 5 are preferably plain and cylindrically curved concavely outward toward the friction elements 3 intermediate the ends, interchangeable with one another and each provided with a pair of embossments or corrugations 16, that is, one at each end of the curve of the spring. The embossments 16 preferably provide nibs or projections 17 extending outwardly and slidably received in corresponding pockets, grooves or indentations 20 in the intermediate friction elements 3. It will also be understood that inasmuch as each plate spring 5 is correspondingly formed, the nibs or projections 17 on each spring will be received or nest in the corresponding depressions 18 formed in the convex faces of the adjacent plates so that all of said springs will be held in proper nested relation with respect to one another, whereby shifting of the springs with respect to each other or laterally with respect to the associated friction elements, and resultant gouging of the engaged sides of the friction elements upon such shifting when the gear is used, is obviated. In order to prevent a complete flattening out of the springs upon compression of the gear, the adjacent surfaces 19 of the intermediate friction elements 3 are preferably formed convex to provide a slight rise and protect the springs against such deflection as would entirely flatten them.

In view of the foregoing it will be seen that I have provided an improved cushioning mechanism and plate springs therefor of special character to obviate shifting thereof and prevent gouging of the adjacent side walls of the associated friction elements. Said elements are also preferably formed so as to obviate the complete flattening of the leaf springs upon full compression of the gear. Although I have shown my novel form of plate springs embodied in a particular form of cushioning mechanism or friction draft gear, it is obvious that I do not wish to be limited to this showing as I may employ any improved springs in my form of draft gear or cushioning mechanism using leaf springs to prevent undesired shifting thereof, as will be understood. It will also be apparent that modifications may be made in the form of cushioning mechanism illustrated without departing from the spirit and scope of my invention as set forth in the appended claims.

Having now described my invention, I claim:

1. Cushioning mechanism comprising outer friction elements formed with end walls and inclined friction surfaces extending therefrom, intermediate friction elements positioned therebetween and formed with correspondingly inclined friction surfaces engaging the friction surfaces of the outer elements, interchangeable leaf springs positioned between the intermediate friction elements for urging them apart and into engagement with the friction surfaces of the outer friction elements, and means for preventing lateral shifting of said leaf springs with respect to said friction elements comprising interlocking projections disposed at the ends of said springs extending from said springs and between the outermost springs for slidable reception in grooves in the corresponding friction elements.

2. Cushioning mechanism comprising outer friction elements, intermediate friction elements positioned therebetween, plate springs disposed between said intermediate friction elements, said springs being arranged in two groups with the springs in each group concavely curved toward the corresponding intermediate friction element, the inner surface of each intermediate friction element being convexly curved toward the associated springs to prevent said springs from being crushed flat upon the application of load.

3. Cushioning mechanism comprising housing castings formed with end walls and inclined walls extending therefrom and providing inclined friction surfaces, wedges positioned therebetween and formed with correspondingly inclined friction surfaces normally engaging the friction surfaces on the housing castings, the walls of said members on which said surfaces are formed being provided with normally interlocking shoulders, whereby the parts may be assembled by pressing the housing castings over the ends of the wedges until the corresponding shoulders interlock, plate springs disposed between said wedges for urging them apart into engagement with the housing castings, said springs being formed in two groups, the springs in each group being concavely curved toward the adjacent wedge, all of said plate springs having corrugated portions providing nibs for nesting said springs with respect to one another and the wedges, said wedges being formed with corresponding depressions receiving the nibs in the outermost springs, the surfaces of said wedges adjacent said outermost springs being convexly curved to prevent entire flattening of said springs upon compression of the mechanism.

4. Cushioning mechanism comprising housing means provided with friction surfaces, a friction element, received therein and engaging said surfaces, a curved plate spring with the concave side engaging said friction element for urging it toward said housing means, said spring being formed with corrugations providing nibs, said friction element having grooves to slidably receive said nibs and prevent lateral shifting of said spring.

5. Cushioning mechanism comprising outer friction means, intermediate friction elements received therein, plate springs disposed between said intermediate friction elements, said springs being arranged in two groups with the springs of each group concavely curved toward the adjacent intermediate friction element, the ends of the springs engaging the friction elements being formed with means interlocking in pockets in said elements to prevent relative shifting the inner surfaces of the intermediate friction elements each presenting a convexly curved portion toward the associated springs to prevent said springs being crushed flat upon the application of load.

6. Cushioning mechanism comprising friction elements movable toward and away from one another, plate springs disposed between said friction elements, said springs being arranged in two groups with those in each group concavely curved toward the corresponding friction element, the inner surface of each friction element extending toward the other beyond the surfaces supporting the ends of the springs to prevent said springs being crushed flat upon the application of load.

7. Cushioning mechanism comprising friction wedges movable toward and away from one another, interchangeable plate springs disposed between said wedges for urging them apart and into frictional engagement with an associated element, said springs being arranged in two groups with the springs in each group concavely curved toward the adjacent wedge, all of said springs having corrugated portions at their outer ends providing interlocking nibs and pockets for nesting said springs with respect to one another and the wedges, said wedges being formed with corresponding grooves slidably receiving the nibs on the outermost springs.

8. Cushioning mechanism comprising spring caps adapted to move toward and away from one another, and curved plate springs interchangeable with one another and disposed between said caps for urging them apart, said springs being disposed in two groups with the springs in each group concavely curved toward the adjacent cap, all of said springs having corrugated portions at their outer ends providing alternate projections and pockets for interlockingly nesting said springs with respect to one another and the caps and preventing lateral shifting therebetween, said caps being formed with grooves slidably receiving the projections from the outermost springs.

In testimony whereof I affix my signature.

FRED GEORGE SUCKOW.